July 26, 1932.  E. K. MALMQUIST  1,869,067
MACHINE FOR TESTING FILLED AND SEALED CANS AND CONTAINERS
Filed March 19, 1929  3 Sheets-Sheet 2
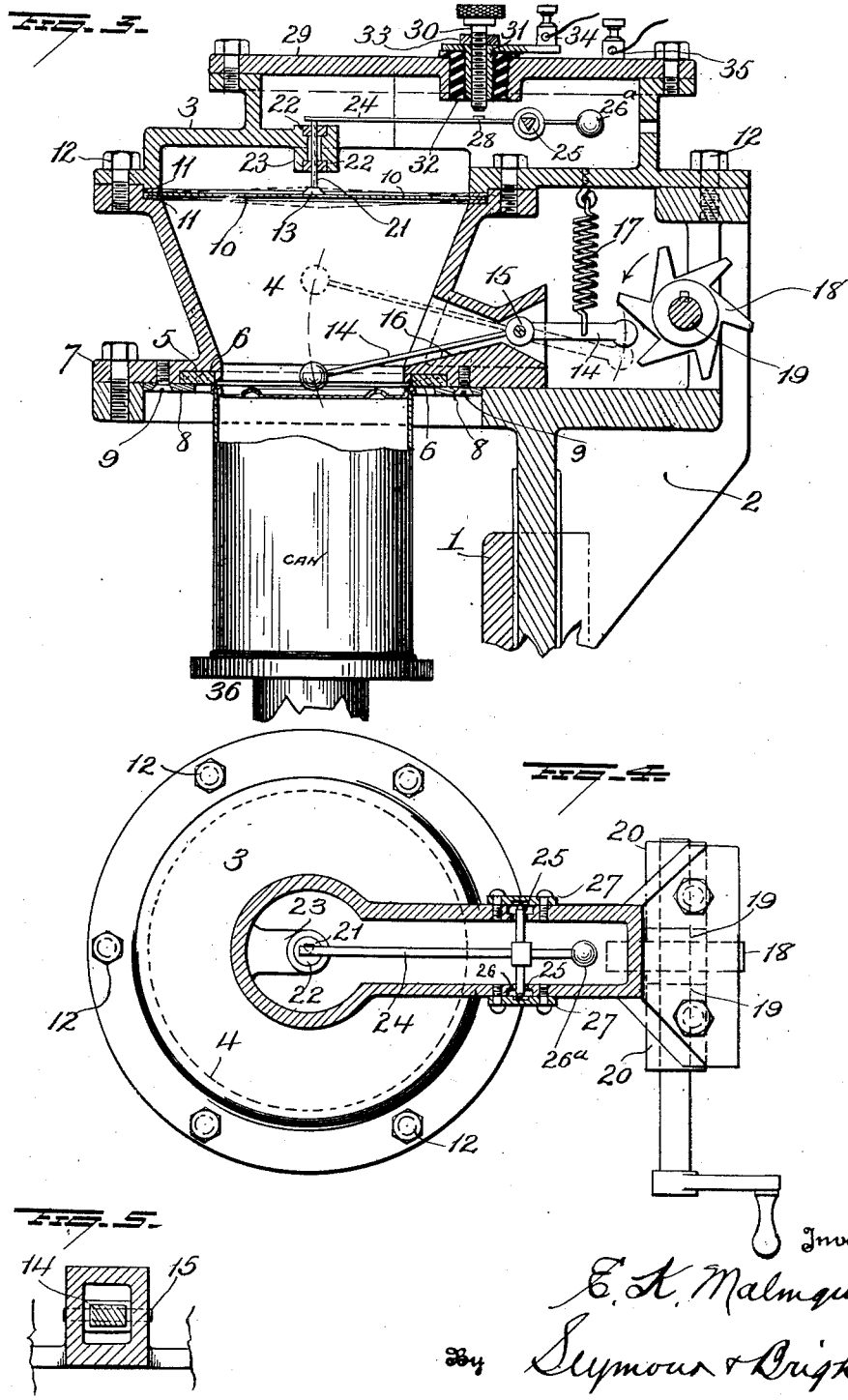
Inventor
E. K. Malmquist
By Seymour & Bright
Attorneys

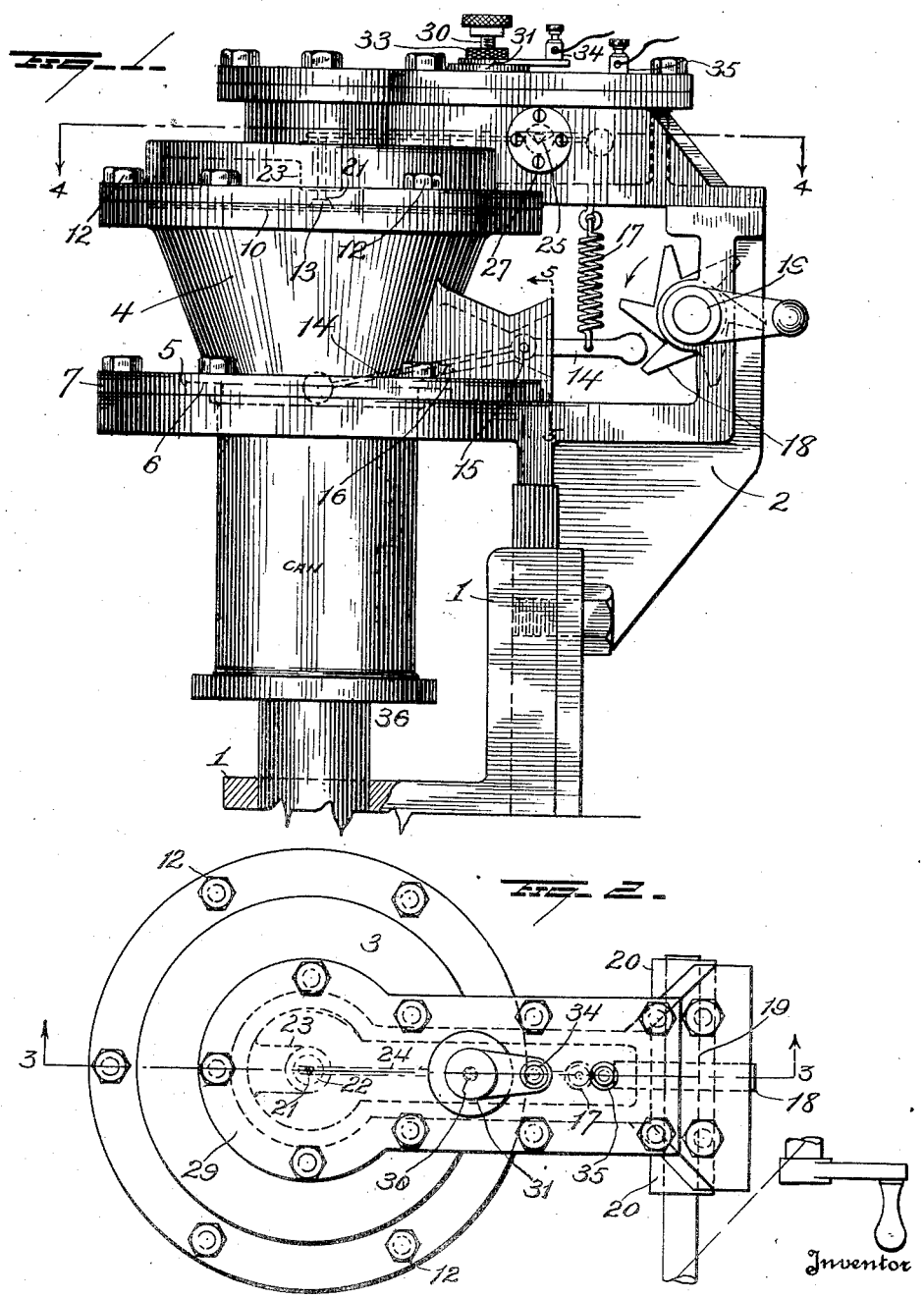

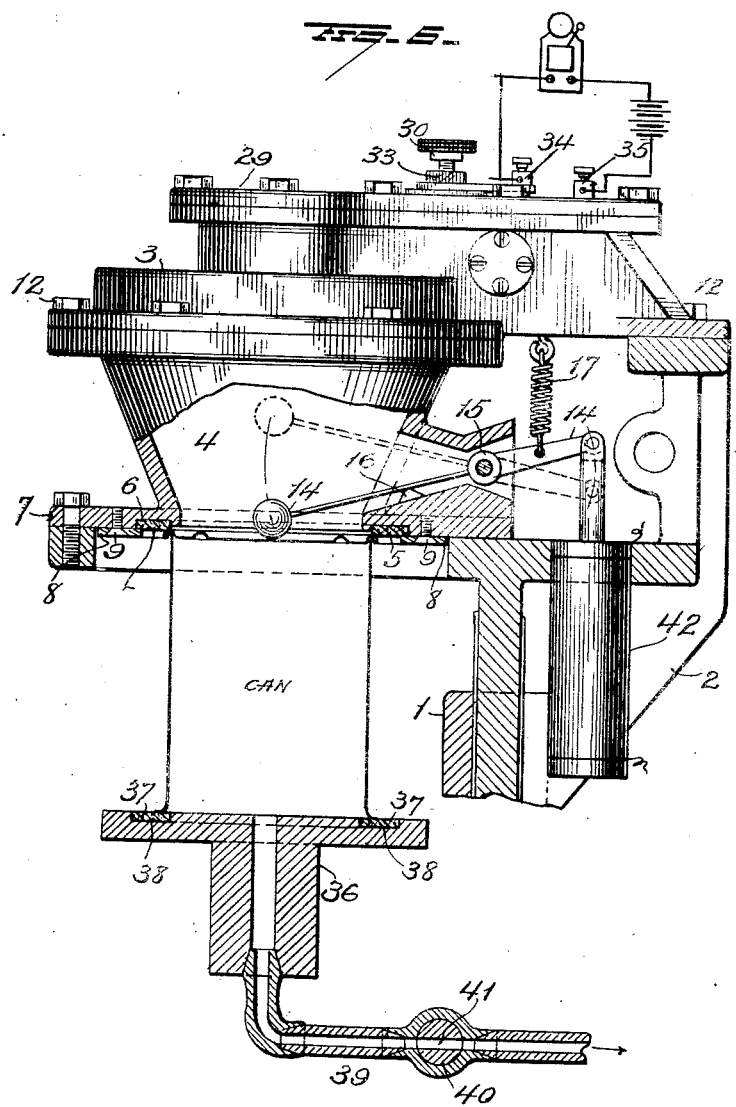

Patented July 26, 1932

1,869,067

UNITED STATES PATENT OFFICE

EMIL K. MALMQUIST, OF SOUTH BELLINGHAM, WASHINGTON

MACHINE FOR TESTING FILLED AND SEALED CANS AND CONTAINERS

Application filed March 19, 1929. Serial No. 348,228.

This invention relates to machines for testing filled and sealed cans and containers, whereof the following is a specification:

It is customary to test the cans and containers used in the canning and preserving industries, after sealing and processing, for the purpose of determining whether the cans have been properly exhausted, whether they are air tight, and also for the purpose of detecting the formation of gas due to improper sterilization or other causes.

A common method now employed for the testing of sealed cans consists in manually striking one end of the can with a light hammer like object, preferably of metal, and noting the sound thus produced, there being a difference in the sound emitted by an air tight and properly exhausted container and that emitted by a leaky or defective container. Obviously such a method of testing, which depends on the skill of the operator in striking the ends of the cans with uniform force, and the sensitiveness of his hearing for detecting the difference in sound emitted by a perfect and a defective container is neither uniform nor accurate. Consequently a large number of defective cans pass inspection, which cans, if stored are liable to leak or burst due to fermentation of the contents, thereby causing damage to sound containers stored in close proximity, due to the corrosive action of the matter discharged.

The object of this invention is to provide a can testing machine that will set each can of a series of cans undergoing test into vibration by the application of a substantially uniform force to each can, and which will provide means for registering the difference in the pitch of the sound waves emitted by the perfect and defective containers, thereby permitting the uniform and accurate testing of filled and sealed cans and containers.

One form which the invention may assume is exemplified in the following description and illustrated by way of example in the accompanying drawings, in which:—

Figure 1 is a side elevation of a sealed can testing machine showing one embodiment of this invention;

Figure 2 is a plan view of the same;

Figure 3 is a vertical section of the same on line 3—3 of Fig. 2;

Figure 4 is a horizontal section of the same on line 4—4 of Fig. 1;

Figure 5 is a fragmentary vertical section of the mounting for the striking means, on lines 5—5 Fig. 1, and Figure 6 is a side elevation of the machine, partly in section, showing modification adapting the machine to the testing of empty unsealed cans.

Similar reference numbers indicate corresponding parts in the different figures of the drawings.

The frame of the machine consists of the main frame 1, of any suitable design; the bracket 2, of any suitable design, slidably mounted in a vertical groove in the main frame, to permit adjustment of the machine to accommodate cans of different sizes; and the upper frame or casting 3, of any suitable design mounted on the bracket 2 by suitable means.

A sound chamber 4 is suitably mounted on the bracket 2, the chamber illustrated being of conical construction, such construction causing an amplification of the sound waves emitted by the cans undergoing test, however it may be of other suitable design.

At the base of the sound chamber 4 is a circular opening, preferably flanged, however, the size and shape of this opening may be changed to adapt the machine for the testing of cans of various sizes and shapes. A gasket or seating ring 5, of rubber or other like material is inserted in the circular groove or slot 6 in the flange 7 suitably held in place by a clamp 8 and screws 9.

The diaphragm 10 is mounted in an opening in the upper and larger end of the sound chamber 4 between the gaskets 11, clamped between the upper face of the sound chamber and the upper frame 3, which is secured to the sound chamber by screws 12. The diaphragm is reinforced at its center by the plate 13, to eliminate wear.

The striking hammer or lever 14 is pivotally mounted on the shaft 15 in an opening in the side wall of the sound chamber, the hammer end, which is preferably spherical in shape, extending into the sound chamber and being capable of movement in the path shown by the dotted line in the Figure 3, the operating end of the striking hammer or lever being without the sound chamber. The portion of the lever arm carrying the hammer or spherical head is preferably flattened to give it resiliency. The movement of the portion of the lever carrying the hammer or spherical head, toward the bottom of the sound chamber is limited by the stop pin 16 or other suitable means so that when the hammer is at rest in its normal position as shown in Fig. 3, the hammer or spherical head will be just above the end of the can to be tested but not in contact therewith. The operating end of the striking hammer or lever is placed under tension by the spring 17 or other suitable means, for the purpose of holding the lever at rest in its normal position as above mentioned.

The star wheel 18 is revolvably mounted and keyed on the shaft 19, journalled in the bearings 20 set in the bracket 2, the bearings being so constructed as to prevent the axial movement of the star wheel. The star wheel 18 is so positioned, that when revolved in the direction indicated by the arrow in Fig. 3 its teeth engage the operating end of the lever 14 causing same to be depressed to the position shown by the dotted lines in Fig. 3.

The communicating pin 21, preferably triangular in cross section, is slidably mounted in a suitable bushing 22, set in the boss 23 of the upper frame member 3, the lower end of the pin resting on the wearing plate 13 of the diaphragm.

The contact lever 24 is pivotally mounted on the shaft 25, bearing in the V-shaped bushings 26, pressed in the upper frame 3. End play in the shaft 25 is prevented by the thrust plates 27 secured to the upper frame by suitable means. Contact lever 24 is so mounted that one end rests on the upper end of the contact pin 21, the opposite end carrying a counter weight 26ª for the purpose of relieving tension on the diaphragm 10 at 13, however, the contact lever should be so balanced that the contact end will always rest on the pin 21 with a slight tension. Contact lever 24 carries the contact point 28.

A cover plate 29 is mounted on the top face of the upper frame 3 and held in place by suitable means. The contact screw 30 is mounted in axial alignment with the contact point 28 in the threaded bushing 31 insulated from the frame of the machine by the dielectric bushing 32, and is held in adjustment by the lock nut 33. The binding post 34 is electrically connected to the contact screw 30 and insulated from the frame. The binding post 35 is grounded to the frame of the machine at a suitable point.

The signal means 100, as shown in Fig. 6, is connected in series with a source of electric power 101, to the binding posts 34 and 35, the lever 24 and the contact screw 30 operating as a circuit breaker. The term "signal" as used herein, is intended to include an electric bell or light or any equivalent device, for advising either visibly or audibly, or otherwise, the emission of sound waves of a pitch such as are emitted by a defective container when set in vibration.

For the purpose of receiving the cans to be tested and placing same in position for test the lifter 36 is slidably mounted in the main frame 1 in axial alignment with the sound chamber 4. The lifter 36 is capable of vertical movement either up or down, for the purpose of placing the cans in the testing position and removing same and may be actuated either manually or by other suitable means.

The machine is operated in the following manner: The container to be tested is placed by any suitable means (said means being shown as hand operated for simplicity), on the lifter 36, and by operation of the lifter, one end of the can is pressed and held against the rubber seating ring 5. After the container is so placed, the star wheel 18 is rotated, by suitable means, in the direction indicated by the arrow in Fig. 3, the teeth of the star wheel engaging the operating end of the lever 14 causing the lever to assume the position indicated by the dotted lines in Fig. 3. Upon further rotation of the star wheel the teeth disengage and release the operating end of the lever and the hammer end is propelled downward by the tension spring 17, the downward movement being limited by the stop pin 16. The inertia of the spherical (or like-shaped) hammer head deflects the portion of the lever arm between the fulcrum and the hammer head causing the hammer head to strike the end of the container undergoing test, a sharp blow, the head due to the resiliency of the lever arm returns practically immediately to its normal position out of contact with the head of the can. In some instances it may be advisable to subject the can undergoing test to a number of blows of the hammer rather than a single sharp blow, and if desirable the machine may be so operated.

The blow of the hammer sets the container undergoing test into vibration causing it to emit sound waves which are amplified by the sound chamber and registered on the diaphragm 10 causing it to assume alternate positions indicated by the dotted lines in Fig. 3, the amplitude of the movement being governed by the pitch of the sound waves emitted by the container. The movement of the diaphragm is communicated by the pin 21 to the contact lever 24 which is set in a rocking motion. As previously stated there is a difference in the pitch of the sound waves emitted by perfect and defective containers, the pitch of the sound wave emitted by defective containers being lower than that of the sound waves emitted by perfect containers. Consequently the sound waves emitted by defective containers cause a greater movement of the diaphragm than those emitted by perfect containers. The machine is therefore adjusted by setting the contact screw 30 in such position that the contact point 28 will be caused to come in contact therewith when the diaphragm is actuated by a sound wave of the pitch emitted by a defective container. The closing of these contact points completes the electrical circuit and causes the signal means to operate, thereby signalling to the operator the fact that the can undergoing test is defective. Upon the completion of the test the lifter is lowered, the container is removed by any suitable means, and the machine is ready to receive the next can.

A modified embodiment of the invention adapted to the testing of empty and unsealed cans is illustrated in Fig. 6. A gasket or sealing ring 37, of rubber or other like material is inserted in the circular groove or slot 38 in the upper face of the lifter 36 for the purpose of affording means for the sealing of the open end of the can to be tested. Means are also provided for exhausting the air from the can, those illustrated consisting of the pipe or air hose 39 connected to an aperture in the lifter 36, the open end of the aperture being in the area of the upper face of the lifter enclosed by the gasket or sealing ring 37. The valve 40 (containing the port 41) is inserted in the pipe or air hose between the testing machine and a suitable suction or exhaustive device, not illustrated. In this modified embodiment electrically operated means for the operation of the striking hammer 14 are illustrated, 42 representing a solenoid the operation of which may be controlled by any suitable means.

This modified machine is operated in the following manner: The can to be tested is placed by any suitable means on the lifter so that the open end thereof rests on the gasket or sealing ring 37, and by operation of the lifter the closed end of the can is pressed and held against the rubber seating ring 5. The valve 40 is then opened and the air is exhausted from the can. When a proper vacuum in the can has been obtained the valve 40 is closed, and the can undergoing test is caused to emit sound waves in the manner hereinbefore described in connection with the testing of sealed and filled cans. If the can undergoing test is perfect and air tight, the vacuum will be maintained and it will upon being struck by the striking hammer emit sound waves of a pitch corresponding to those emitted by perfect filled and sealed containers, while on the other hand if the can is defective or leaky and air enters through seam leaks or other defects, the container when struck will emit sound waves of a pitch corresponding to those emitted by defective filled and sealed cans.

The machine is for simplicity illustrated as hand operated, but may be power operated by any suitable means and the operation may be made entirely automatic by synchronizing the can feeding and removing means, and the striking means. Further electrically operated means for striking the cans may be substituted for the mechanically operated means illustrated.

While the preferred embodiment of the invention is herein described, alterations may be made without departing from the spirit and scope of the invention as expressed in the claims.

Having fully described my invention what I claim as new and desire to secure by Letters-Patent, is:—

1. An apparatus of the character described comprising can testing means, said testing means being adapted to cause the cans subjected to test to emit sound waves, and to detect the difference in pitch of the sound waves emitted by perfect and defective cans, and including means operated by the sound waves emitted to automatically signal the detection of defective cans.

2. An apparatus of the character described, comprising can testing means, said testing means being adapted to cause the cans subjected to test to emit sound waves, to amplify the sound waves emitted, and to detect the difference in pitch of the sound waves emitted by perfect and defective cans, and including means operated by the sound waves emitted to automatically signal the detection of defective cans.

3. An apparatus for testing filled cans comprising movable means to which cans may be fed, testing means associated with said movable means and capable of causing the cans subjected to test to emit sound waves and of detecting improperly sealed or evacuated cans by the pitch of the sound waves emitted by such cans, and including means operated by the sound waves emitted to automatically signal the detection of defective cans.

4. An apparatus for testing filled cans comprising movable means to which cans may be fed, testing means associated with said movable means and capable of causing the cans subjected to test to emit sound waves, of detecting improperly sealed or evacuated cans by the pitch of the sound waves emitted and including means operated by the sound waves emitted to automatically signal the detection of improperly sealed or evacuated cans.

5. A can testing machine, comprising a sound chamber, means to cause the cans to be tested to emit sound waves into said sound chamber, and means operated by the sound waves emitted to signal the detection of improperly sealed or evacuated cans.

6. A can testing machine, comprising a sound chamber, means to cause the cans to be tested to emit sound waves into said sound chamber, said sound chamber forming means to amplify said sound waves, and means operated by the sound waves emitted to automatically signal the emission of sound waves of a predetermined pitch.

7. A can testing machine, comprising a sound chamber, means for applying an equal force to a series of cans to be tested for the purpose of causing the cans to emit sound waves into the sound chamber, and means operated by the sound waves emitted to automatically signal the emission of sound waves of a predetermined pitch.

8. A can testing machine comprising can striking, means to cause cans subjected to test to emit sound waves, and means operated by the sound waves to automatically signal the emission of sound waves of a predetemined pitch.

9. A filled can testing machine, comprising a sound chamber having a flanged opening at one end and a diaphragm mounted in an opening at the opposite end, movable means for placing and holding one end of the can to be tested against the flange of the opening in the sound chamber, means to cause the can to emit sound waves into the sound chamber, a diaphragm actuated by the sound waves emitted, means actuated by the diaphragm capable of operating a signal when the diaphragm is vibrated by a sound wave of predetermined pitch, and signal means to indicate the detection of defective cans.

10. A filled can testing machine, comprising a sound chamber having substantially opposed openings, a diaphragm mounted in one opening, means for closing the substantially opposite opening by the end of the can to be tested, means within the sound chamber, capable of being operated from without, to cause a sharp blow to be delivered to the end of the can to be tested to cause the can to vibrate and emit sound waves into the sound chamber for the purpose of actuating the diaphragm, adjustable means actuated by the diaphragm capable of operating a signal when the diaphragm is vibrated by a sound wave of predetermined pitch, and signal means operated by said adjustable means to indicate the detection of defective cans.

11. A filled can testing machine, comprising a sound chamber having substantially opposed openings, a diaphragm mounted in one opening, means for clamping one end of the can to be tested in the opposite opening, means to cause the can to vibrate and emit sound waves into the sound chamber, adjustable means actuated by the diaphragm when the diaphragm is vibrated by a sound wave of a predetermined pitch, and signal means operated by said adjustable means to indicate the detection of defective cans.

12. An apparatus for testing empty and unsealed cans, comprising movable means to which cans may be fed, means for sealing the open end of the cans undergoing test and for exhausting the air therefrom, testing means associated with said movable means and capable of causing the cans to emit sound waves and of detecting imperfect or leaky cans by the pitch of the sound waves emitted by such cans, and means operated by the sound waves emitted to automatically signal the detection of imperfect or leaky cans.

13. An empty can testing machine, comprising a sound chamber having a flanged opening at one end and a diaphragm mounted in an opening at the opposite end, means for sealing the open end of the cans to be tested, means for clamping and holding the closed end of the cans against the flange of the opening in the sound chamber, means for exhausting the air from the cans, means to cause the cans to emit sound waves into the sound chamber for the purpose of actuating the diaphragm, means actuated by the diaphragm capable of operating a signal when the diaphragm is vibrated by a sound wave of predetermined pitch, and signal means operated by the diaphragm to indicate the detection of defective or leaky cans.

14. A method for testing filled and sealed cans comprising striking successive cans uniform blows to cause them to emit sound waves, causing said sound waves to vibrate a diaphragm, and utilizing said vibrations to signal when a defective can has been tested.

15. A method for testing filled and sealed cans, comprising striking cans to cause the same to emit sound waves, utilizing said sound waves to cause vibrations, and utilizing said vibrations to signal the condition of one of the cans.

In testimony whereof I have signed this specification.

EMIL K. MALMQUIST.